UNITED STATES PATENT OFFICE.

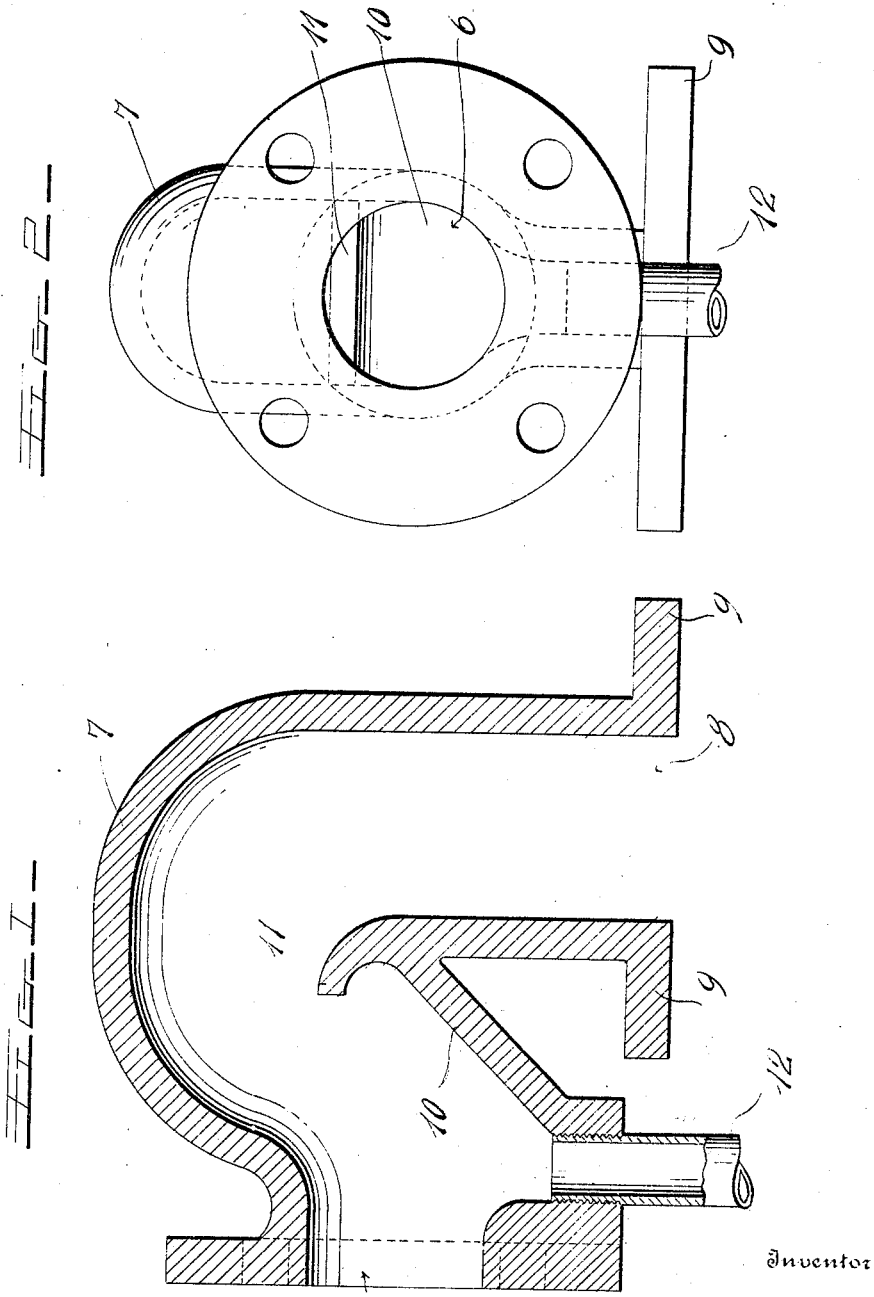

CARL T. LINDSTROM, OF ALLENTOWN, PENNSYLVANIA, ASSIGNOR TO JOHN T. LINDSTROM, OF ALLENTOWN, PENNSYLVANIA.

STEAM-SEPARATOR.

1,382,100.　　　　　Specification of Letters Patent.　Patented June 21, 1921.

Application filed September 13, 1920. Serial No. 409,955.

*To all whom it may concern:*

Be it known that I, CARL T. LINDSTROM, a citizen of the United States, residing at Allentown, in the county of Lehigh and State of Pennsylvania, have invented certain new and useful Improvements in Steam-Separators, of which the following is a specification.

This invention relates to steam separators or the like, and has for its particular object to provide a simple and improved device for separating steam and water or oil or other liquid, the device being also constructed in such manner as to produce in one fitting a separator and an elbow, so that it will take the place of two separate fittings ordinarily employed for said purposes.

I am aware that steam separators have been proposed having deflectors or baffles which catch the liquid and deliver the same to a separate outlet, but the present device has practical advantages over the prior devices known to me, as will more fully appear hereinafter.

The device is illustrated in the accompanying drawing in which Figure 1 is a section of the separator and Fig. 2 is a front view thereof.

As stated, the device combines the functions of a separator and an elbow in a single fitting or casing. This casing has an inlet at 6 at one side thereof, leading into a chamber the top of which is dome-shaped as indicated at 7, and from this chamber extends an outlet 8 leading vertically or downwardly to the bottom of the casing. Flanges 9 are provided for attaching the same to a pipe line. The casing thus forms an elbow with a rise or dome-shaped part at the top, and with a horizontal inlet at one side and a vertical outlet at the bottom.

The inner bend or angle of the elbow is formed by the inner wall of the outlet 8 and an inclined wall 10, these walls terminating in a curved deflector 11 somewhat higher than the center line of the inlet, and directed toward said inlet, this deflector or baffle extending straight across the passage. The inclined wall 10 leads to an outlet pipe 12 tapped into the lower wall of the casing adjacent to the inlet 6, said pipe 12 forming an outlet for the oil or water of condensation.

In use steam flowing through the separator strikes the deflector and the liquid matter is caught by the deflector and the inclined wall and flows out through the pipe 12. The steam rises or passes upwardly from the deflector into the dome-shaped part of the casing and passes thence downwardly to the outlet 8.

The device has the advantage that after the steam is separated from the condensation or liquid it does not pass in contact therewith, and consequently is delivered as dry steam, instead of as saturated steam which results from the ordinary type of separator in which the steam remains in contact with the condensation. It will also be seen that the device serves the purpose of both a separator and an elbow in one fitting, and can consequently be used instead of an ordinary elbow in the steam line and without the necessity for a separate elbow, thus decreasing the first cost and reducing the number of joints, packings and bolts. The practical advantages of the device will commend itself to those familiar with the art, and seeking a cheap and simple device for the purposes indicated. It may be remarked that the top of the lip 11 is preferably located about on a line with the top of the inlet 6, so that the entire volume of steam has to lift above the deflector as it passes therefrom, which assists the efficiency of the separating action.

I claim:

1. A separator comprising an elbow casing having an inlet at the side and a steam outlet at the bottom, the outer bend of the elbow being raised above the inlet to form a dome-shaped chamber, and the inner bend of the elbow having an inclined wall leading upwardly into said chamber and terminating in a backwardly curved lip, and an outlet for liquid at the lower end of said inclined wall.

2. A separator comprising an angular casing having an inlet at the side and an outlet at the bottom, the top wall of said casing being curved upwardly to form a chamber elevated above the plane of the inlet, and the bottom wall of the casing being inclined upwardly from a point adjacent the inlet to a point within said elevated chamber and provided at the upper end of the incline with a lip extending across the chamber and curved backwardly toward the inlet, the upper edge of said lip being approximately at the level of the top of the inlet, and a liquid outlet in the lower part of the casing adjacent the lower edge of said inclined wall.

In testimony whereof, I affix my signature in presence of two witnesses.

CARL T. LINDSTROM.

Witnesses:
J. ROY COLIER,
PAUL C. WIESNER.